United States Patent
Huang

(10) Patent No.: US 9,115,773 B2
(45) Date of Patent: Aug. 25, 2015

(54) DRIVING END OF TOOL

(71) Applicant: New Way Tools Co., Ltd., Taichung (TW)

(72) Inventor: Ping-Wen Huang, Taichung (TW)

(73) Assignee: New Way Tools Co., Ltd., Taichung (TW)

(*) Notice: Subject to any disclaimer, the term of this patent is extended or adjusted under 35 U.S.C. 154(b) by 462 days.

(21) Appl. No.: 13/678,661

(22) Filed: Nov. 16, 2012

(65) Prior Publication Data

US 2013/0180817 A1 Jul. 18, 2013

(30) Foreign Application Priority Data

Jan. 16, 2012 (TW) .............................. 101101590 A
Apr. 27, 2012 (TW) .............................. 101115122 A

(51) Int. Cl.
| B25B 13/46 | (2006.01) |
|---|---|
| F16D 41/16 | (2006.01) |
| B25B 17/02 | (2006.01) |
| B25B 17/00 | (2006.01) |
| B25B 23/00 | (2006.01) |

(52) U.S. Cl.
CPC .............. *F16D 41/16* (2013.01); *B25B 13/462* (2013.01); *B25B 13/463* (2013.01); *B25B 13/467* (2013.01); *B25B 17/00* (2013.01); *B25B 17/02* (2013.01); *B25B 23/0035* (2013.01)

(58) Field of Classification Search
CPC .. B25B 13/163; B25B 13/167; B25B 13/162; B25B 17/00; B25B 17/02
USPC ..................................................... 81/60–63.2
See application file for complete search history.

(56) References Cited

U.S. PATENT DOCUMENTS

| 471,765 A | 3/1892 | Wever et al. ...................... 81/62 |
|---|---|---|
| 919,260 A * | 4/1909 | Smith .......................... 81/57.46 |
| 2,680,983 A | 6/1954 | Miller ............................ 81/57.3 |
| 3,175,433 A | 3/1965 | Akers, Jr. ..................... 81/57.22 |
| 6,112,621 A | 9/2000 | Ochiai ........................ 81/57.29 |
| 7,089,830 B2 | 8/2006 | Hu .................................. 1/63.1 |
| 7,938,043 B2 | 5/2011 | Hu .................................. 1/63.2 |
| 8,375,830 B1 * | 2/2013 | Yang ................................ 81/60 |
| 8,973,469 B2 * | 3/2015 | Yang ................................ 81/60 |
| 2013/0276593 A1 | 10/2013 | Yang ................................ 81/60 |

FOREIGN PATENT DOCUMENTS

TW 459593 10/2001

* cited by examiner

Primary Examiner — Bryan R Muller
(74) Attorney, Agent, or Firm — Alan D. Kamrath; Kamrath IP Lawfirm, P.A.

(57) ABSTRACT

A driving end of a tool includes a body including a chamber and a bore. The chamber includes first and second pawls disposed therein. A first engaging member is rotatably disposed in the chamber and defines a first engaging section with a plurality of teeth. A second engaging member is rotatably disposed in the chamber and defines first and second engaging areas. The first engaging section is engaged with the first engaging area. The first and second engaging areas are selectively engaged with the first and second pawls. A switch includes an activating member inserted through the bore and received in the second engaging member and operably rotatable to first and second positions selectively.

19 Claims, 11 Drawing Sheets

DRIVING END OF TOOL

BACKGROUND OF THE INVENTION

1. Field of the Invention

The present invention relates to a driving end of a tool and, in particular, to a driving end that a user can operably move through a small angle to drive an object engaged therewith, as well as has a simple structure and is able to withstand high torque transmission.

2. Description of the Related Art

TW Patent No. 459593 shows a wrench with an improved structure. The wrench includes a driving end including a chamber. A gear wheel is disposed in the chamber. A receiving slot is extended in the chamber. A pivot shaft is disposed in the receiving slot and includes a gear pivotally engaged therewith. The gear is engaged with the gear wheel. A shaft with a plurality of teeth is engaged with the gear and the gear wheel. A control mechanism is received in the receiving slot to control the direction of rotation of the gear wheel. The control mechanism includes a pawl to engage with the gear wheel.

It is still desirable to improve the mechanism set forth in order to provide a wrench that is able to withstand high torque transmission.

The present invention is, therefore, intended to obviate or at least alleviate the problems encountered in the prior art.

SUMMARY OF THE INVENTION

According to the present invention, a driving end of a tool includes a body including a chamber and a bore, with the chamber defines first and second sectional areas, with the bore extended into the second sectional area, with the second sectional area including first and second pawls on two opposite sides thereof. A first engaging member is rotatably disposed in the first sectional area and defines a first engaging section, with the first engaging section extended circumferentially on an outer periphery of the first engaging member and with a plurality of teeth. A second engaging member is rotatably disposed in the second sectional area and defines first and second engaging areas, with the first engaging section engaged with the first engaging area, with the first and second engaging areas selectively engaged with the first and second pawls, with the second engaging area extended outward from the first engaging area and circumferentially on an outer periphery of the second engaging member and with a plurality of teeth. A switch includes an activating member inserted through the bore and is operably rotatable about a fixed axis to first and second positions selectively, with the second engaging member rotated eccentrically about the fixed axis upon rotation of the switch, with the switch operated to the first position that an operation of driving the driving end of the tool in a first direction causes the second engaging member to move towards and include the second engaging area engaging with the first pawl and such that an object engaged with the driving end of the tool is able to be driven in the first direction and that an operation of driving the driving end in a second direction opposite the first direction causes the second engaging member to move away the first pawl and such that the driving end of the tool is in a freewheel rotation with respect to the object engaged therewith, with the switch operated to a second position that an operation of driving the driving end in the second direction causes the second engaging member to move towards and include the second engaging area engaging with the second pawl and such that an object engaged with the driving end is able to be driven in the second direction and that an operation of driving the driving end in the first direction causes the second engaging member to move away the second pawl and in a freewheel rotation with respect to the object engaged therewith.

It is an objective of the present invention to provide a driving end of a tool with a simple structure, but able to withstand high torque transmission.

It is another object of the present invention to provide a driving end of a tool that a user can operably move through a small angle to drive an object engaged therewith.

Other objects, advantages, and new features of the present invention will become apparent from the following detailed description of the invention when considered in conjunction with the accompanied drawings.

DETAILED DESCRIPTION OF THE INVENTION

Figure 1:
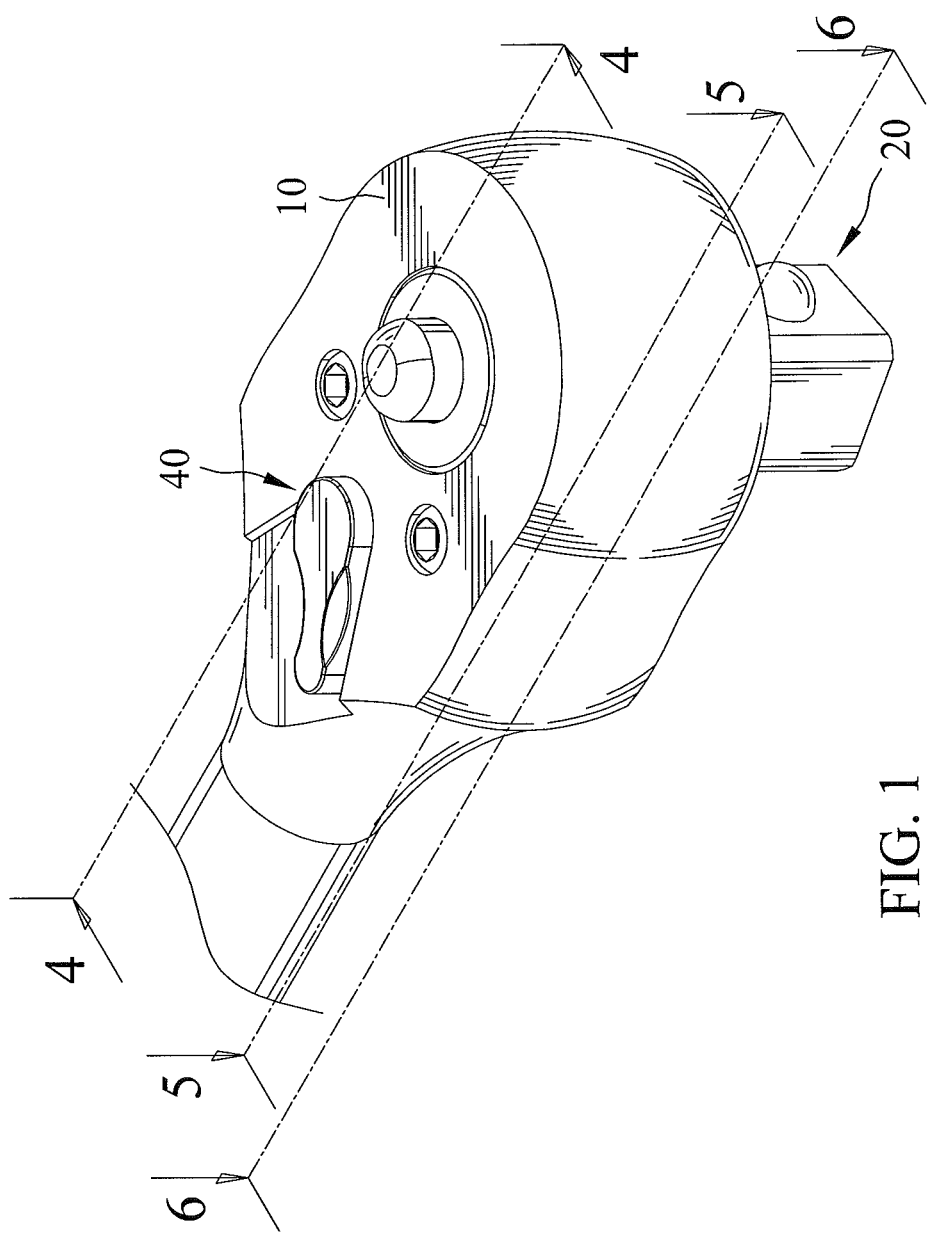
FIG. 1 is a perspective view of a driving end of a tool in accordance with a first embodiment of the present invention.
Figure 3:
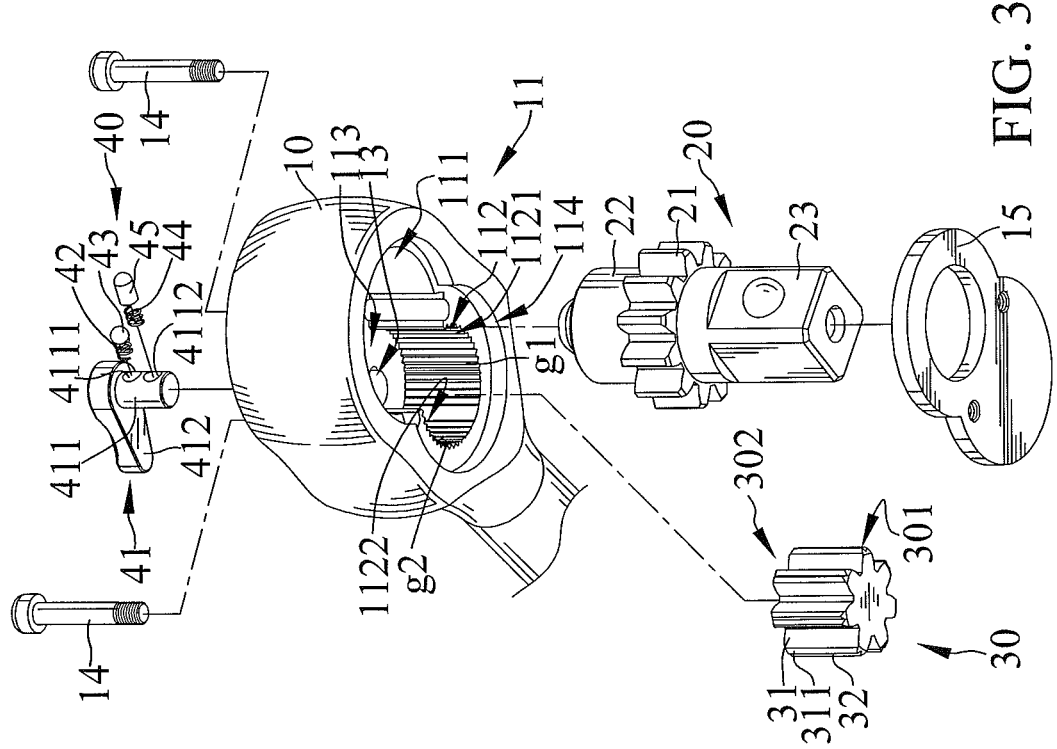
FIG. 3 is another exploded perspective view of the driving end of the tool shown in FIG. 1.
Figure 2:
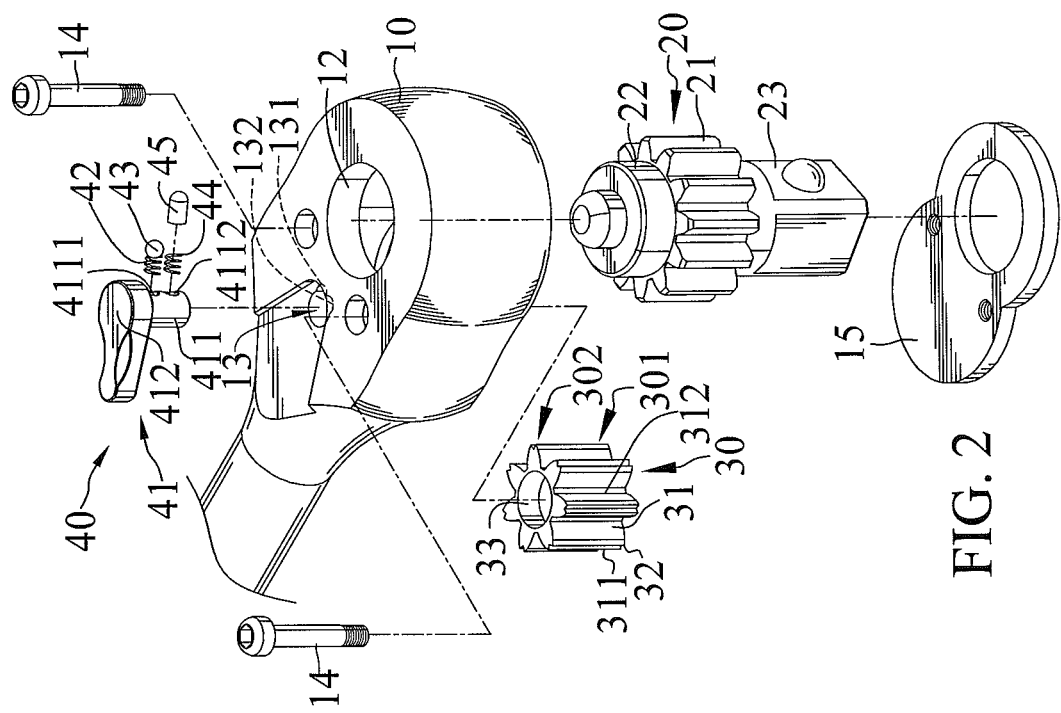
FIG. 2 is an exploded perspective view of the driving end of the tool shown in FIG. 1.
Figure 4:
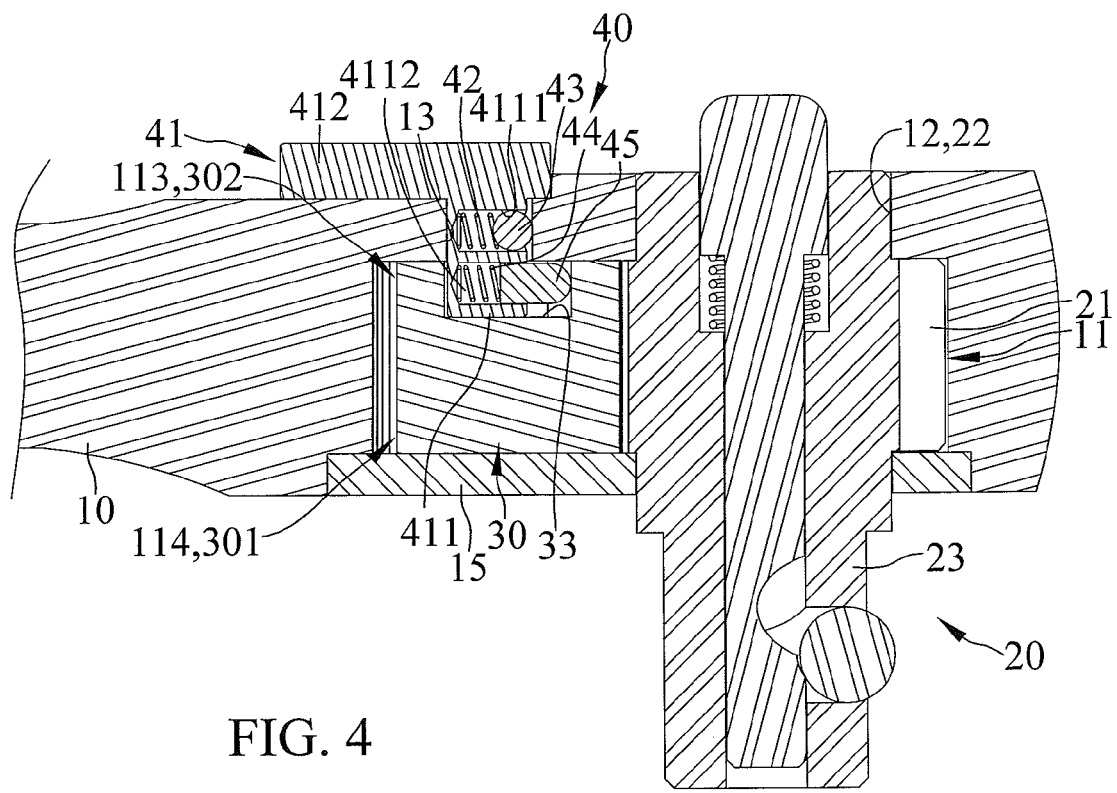
FIG. 4 is a cross-sectional view taken along line 4-4 of FIG. 1.
Figure 5:
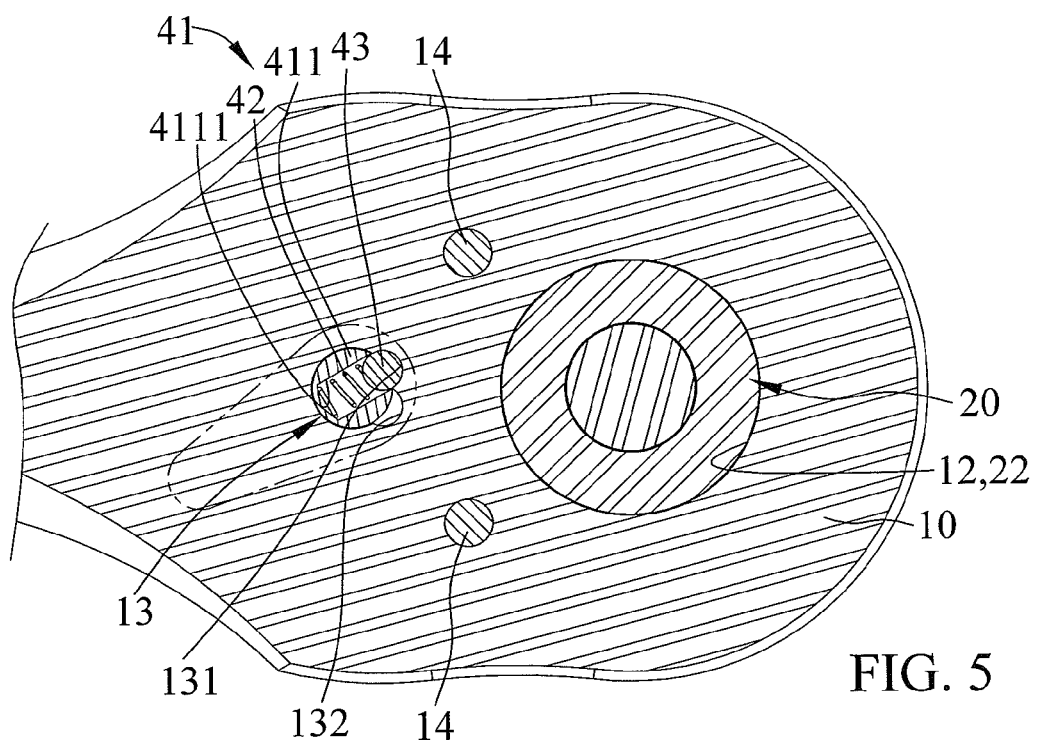
FIG. 5 is a cross-sectional view taken along line 5-5 of FIG. 1 and shows the driving end of the tool including a switch operated to a first position.
Figure 6:
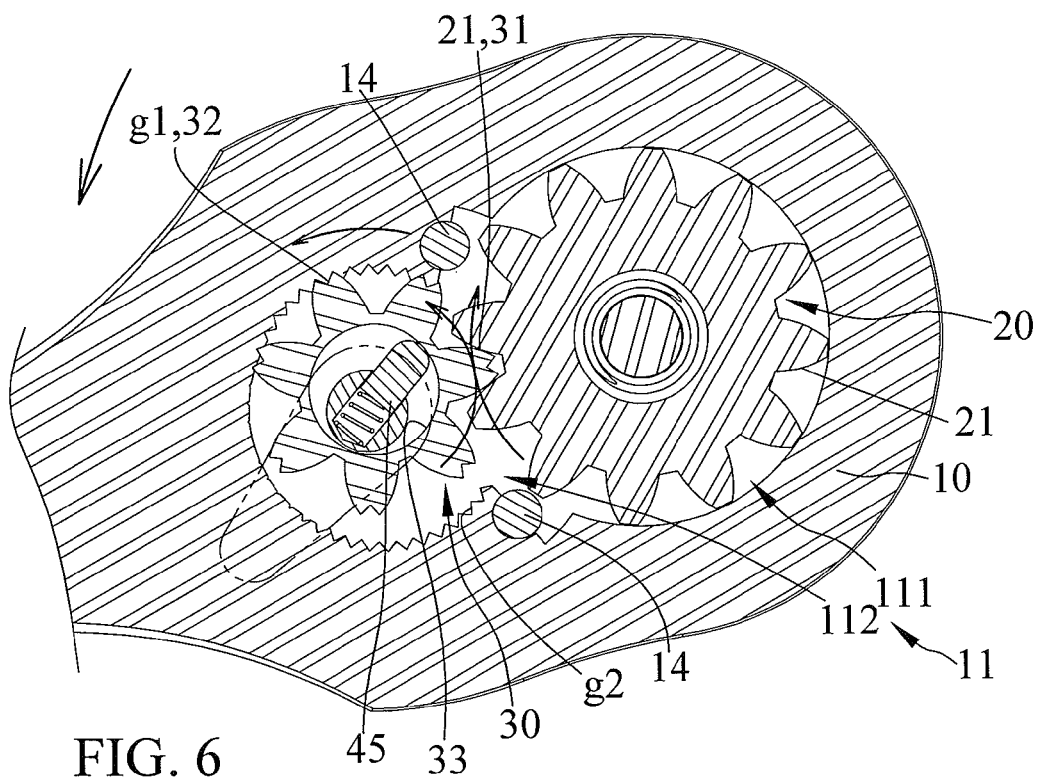
FIG. 6 is a cross-sectional view taken along line 6-6 of FIG. 1 and shows the driving end of the tool in an operation of being turned anticlockwise, with the switch operated to the first position.
Figure 7:
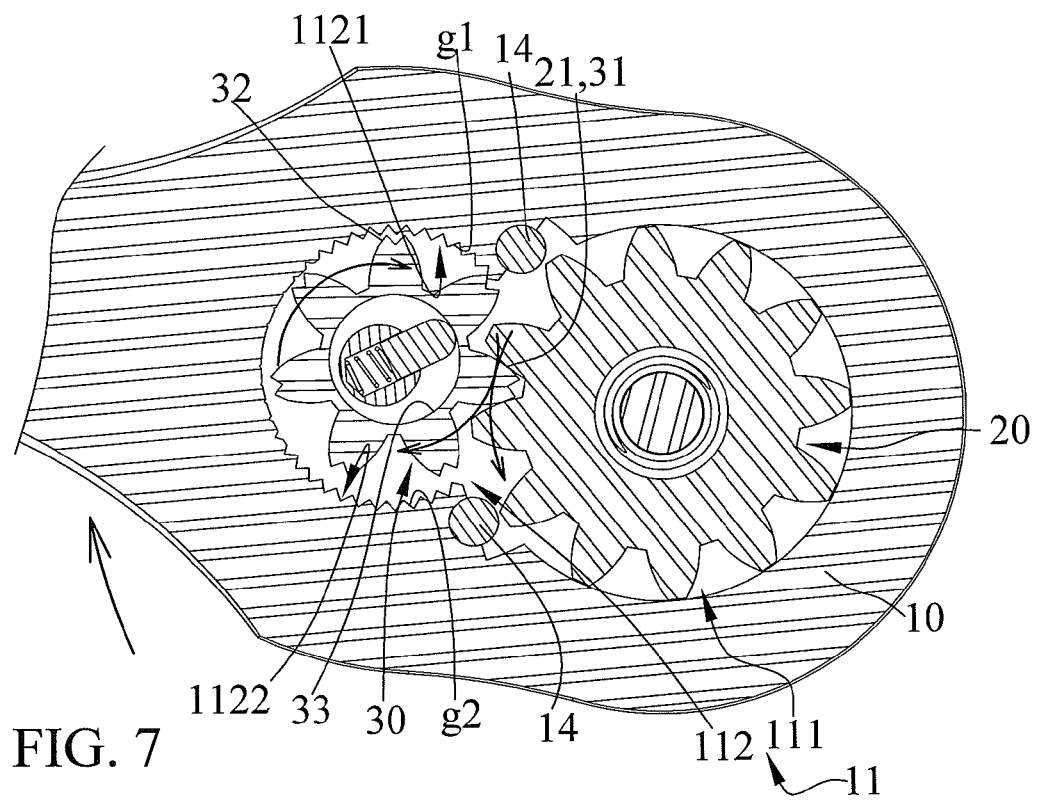
FIG. 7 is a cross-sectional view showing the driving end of the tool in an operation of being turned clockwise, with the switch operated to the first position.
Figure 8:
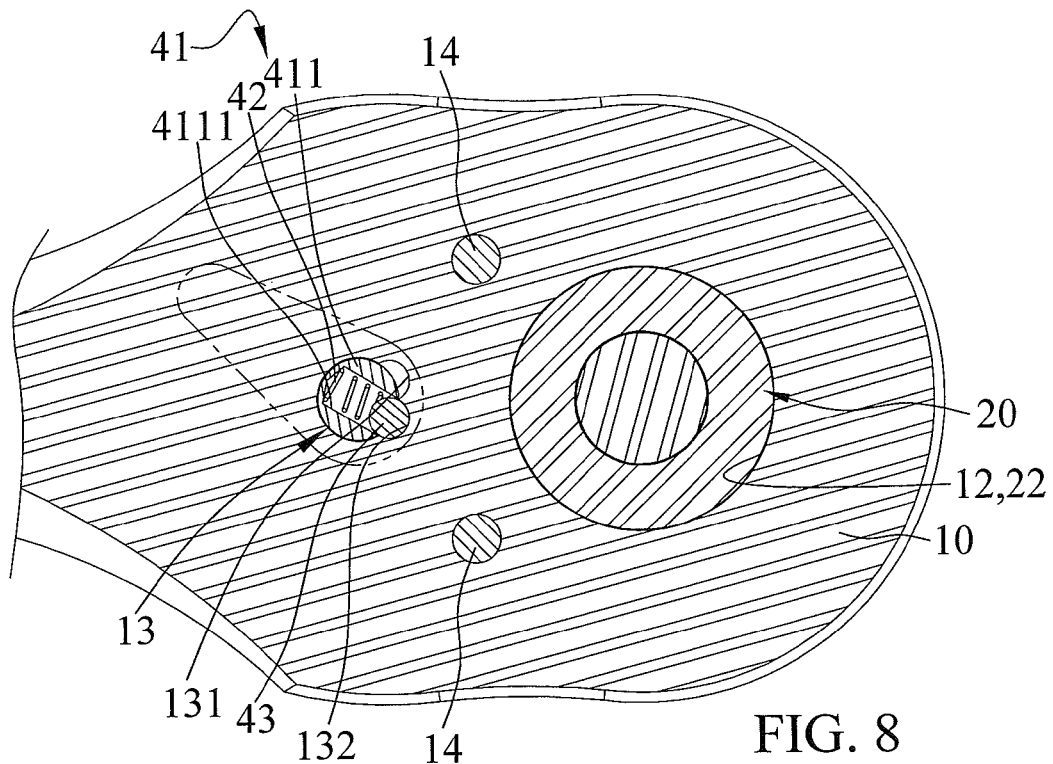
FIG. 8 is a cross-sectional view similar to FIG. 5, but shows the switch operated to a second position.
Figure 9:
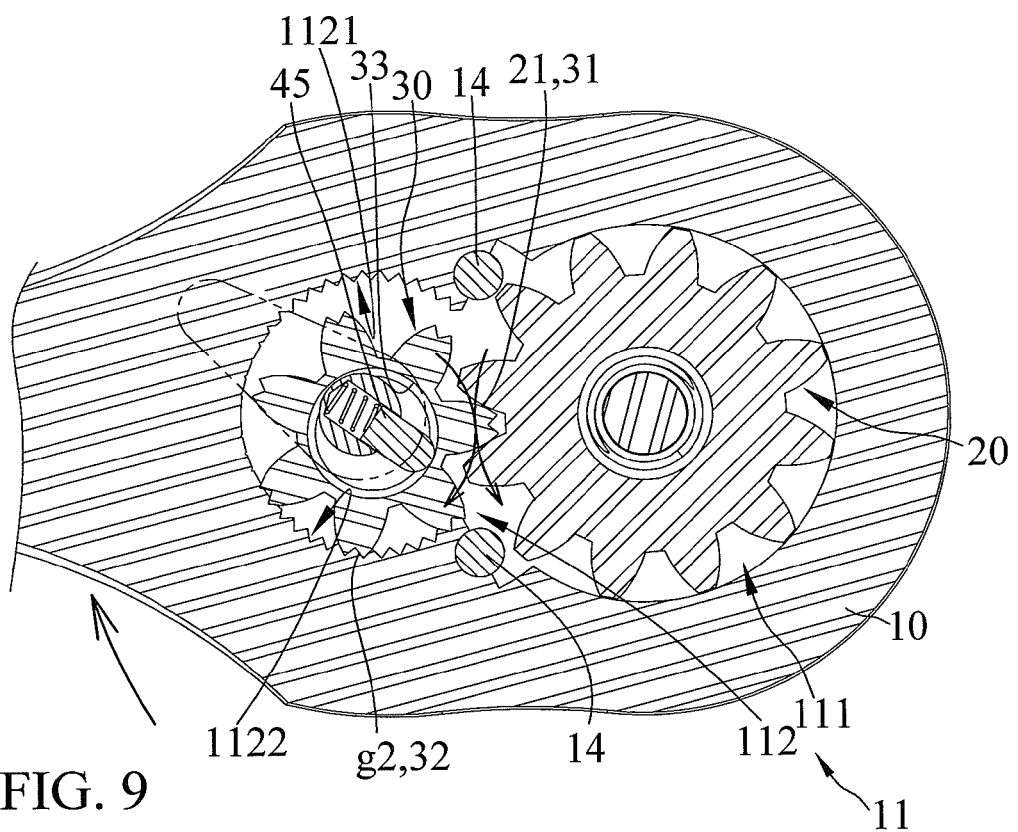
FIG. 9 is a cross-sectional view showing the driving end of the tool in an operation of being turned clockwise, with the switch operated to the second position.
Figure 10:
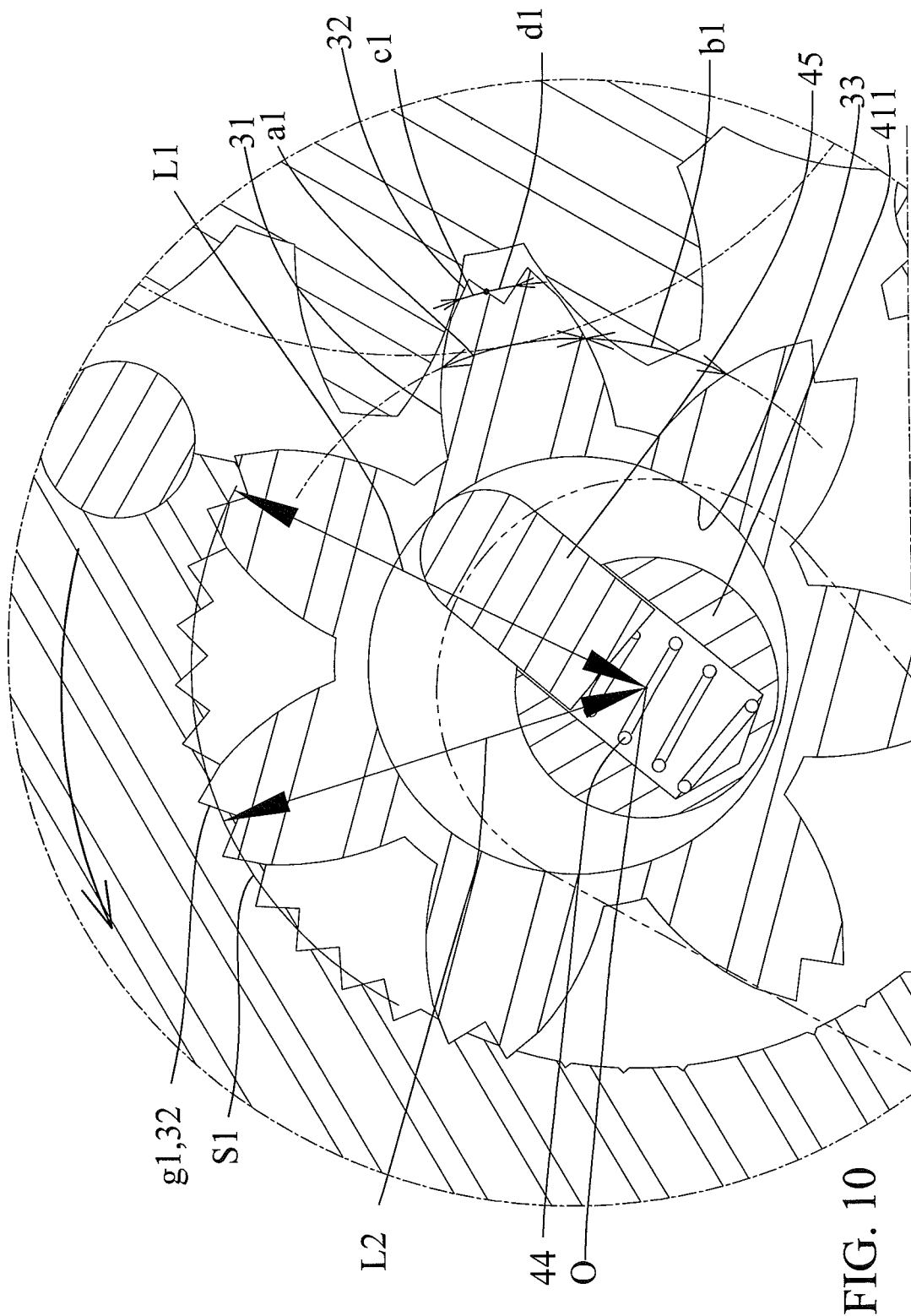
FIG. 10 is a partial enlarged view of FIG. 6.
Figure 11:
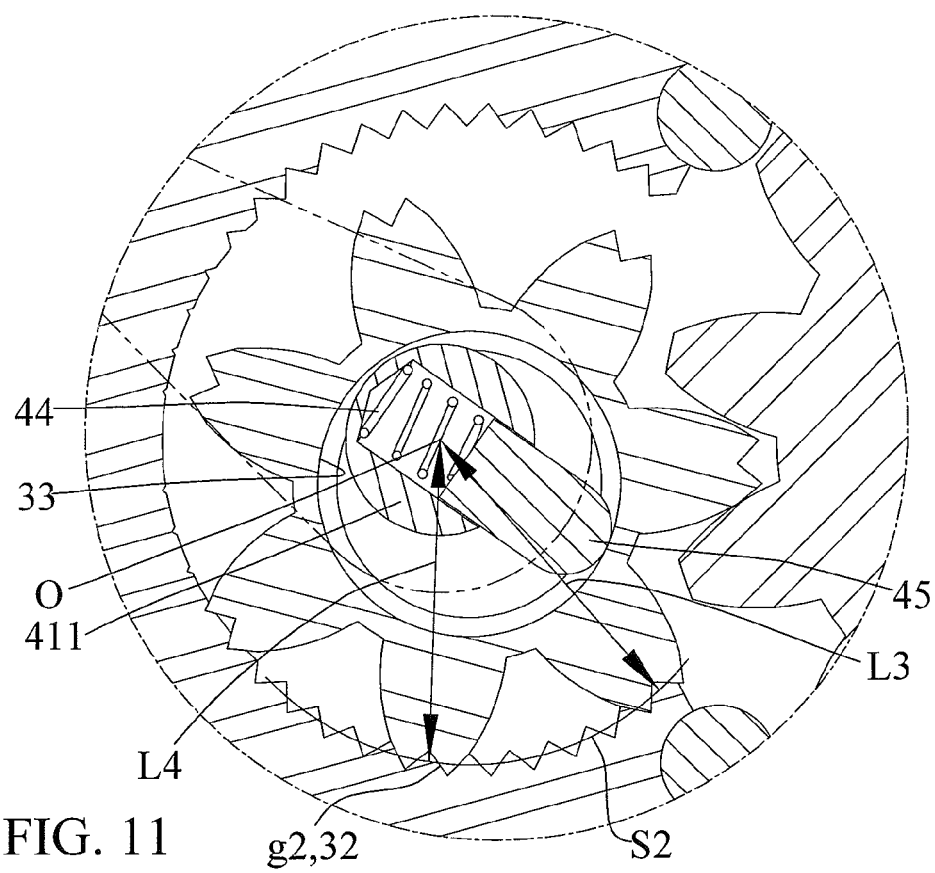
FIG. 11 is a partial enlarged view of FIG. 9.

FIGS. 1 through 11 show a driving end of a tool in accordance with a first embodiment of the present invention. A driving end of a tool includes a body 10, first and second engaging members 20 and 30, and a switch 40.

The body 10 includes a chamber 11 and a bore 13. The chamber 11 defines first and second sectional areas 111 and 112. The second sectional area 112 includes first and second pawls g1 and g2 with a plurality of teeth on two opposite sides thereof. The two opposite sides defining a first side 1121 and a second side 1122. Each of the first and second sides 1121 and 1122 has an arcuate shape. The chamber 11 includes an open end 113 and a closed end 114. The chamber 11 includes the closed end 114 including a hole 12 extended therethrough. A cover member 15 is used for closing the open end 113 of the chamber 11. The cover member 15 is fixed by two stoppers 14. The two stoppers 14 are inserted through the cover member 15 and received in the second sectional area 112. The bore 13 is extended into the second sectional area 112. The body 10 includes first and second recesses 131 and 132 extended therein and into the bore 13.

The first engaging member 20 is rotatably disposed in the first sectional area 111 and defines a first engaging section 21. The first engaging section 21 is extended circumferentially on an outer periphery of the first engaging member 20 and with a plurality of teeth. The first engaging member 20 defines a second engaging section 22. The second engaging section 22 is extended through the hole 12 and exposed outside chamber 11. The first engaging member 20 also defines a third engaging section 23 for engaging with an object to be driven by the driving end of the tool. The third engaging section 23 is inserted through the cover member 15 and disposed outside the chamber 11. The third engaging section 23 includes a stem and a detent mechanism mounted on the stem. The third engaging section 22 is adapted to engage with an object to be driven by the driving end of the tool, with the stem joining the object to be driven and the detent mechanism securing it to the stem. The second engaging section 22 is used for controlling the detent mechanism. A user can easily operate the detent mechanism since the second engaging section 22 is exposed outside the chamber 11.

The second engaging member 30 is rotatably disposed in the second sectional area 112 and includes a receptacle 33 extended therein and defines first and second engaging areas 31 and 32. The second engaging member 30 includes a first end 301 and a second end 302 opposite to the first end 301. The first and second ends 301 and 302 are longitudinally apart from each other at a distance defining a longitudinal length of the second engaging member 30. The second engaging member 30 includes the first and second engaging areas 31 and 32 extended along the longitudinal length thereof and from the first end 301 to the second end 302 thereof. The first engaging section 21 is engaged with the first engaging area 31. The first and second engaging areas 31 and 32 are selectively engaged with the first and second pawls g1 and g2. The second engaging area 32 is extended outward from the first engaging area 31 and circumferentially on an outer periphery of the second engaging member 30 and with a plurality of teeth. Each of the plurality of teeth of the second engaging area 32 of the second engaging member 30 has an identical shape and is extended in a same radial length. The first engaging area 31 of the second engaging member 30 forms a plurality of teeth and includes each of the plurality of teeth with a first tooth thickness a1 and two adjacent teeth with a first width of space b1. The second engaging area 32 of the second engaging member 30 includes each of the plurality of teeth with a second tooth thickness c1 and two adjacent teeth with a second width of space d1. The first engaging area 31 includes each of the plurality of teeth thereof defining a top end 311 and a bottom end 312. The second engaging area 32 includes the plurality of teeth thereof extended on the top ends 311 of the plurality of teeth of the first engaging area 31. In order to make the driving end of the tool well withstand high torque transmission, the ratio of first tooth thickness a1 to first width of space b1 is in a range of 1~1.14, the ratio of second tooth thickness c1 to first width of space d1 is in a range of 0.92~1.22.

The switch 40 includes an activating member 41 inserted through the bore 13 and received eccentrically in the receptacle 33 and operably rotatable about a fixed axis to first and second positions selectively. The switch 40 also defines a handle end 42 extended from the fixing end 411 and exposed outside the receptacle 33. The second engaging member 30 is rotated eccentrically about the fixed axis upon rotation of the switch 40. The switch 40 defines a fixing end 411 inserted through the bore 13 and received eccentrically in the receptacle 33. The switch 40 is operably rotated about a center O of the fixing end 711. The center O is disposed on the fixed axis. The second engaging member 30 including the second engaging area 32 engaging the first pawl g1 defines first and second distances from pitch circles of first and second of the plurality of teeth of first pawl g1 to the center O determining first and second lengths L1 and L2, respectively. The first and second lengths L1 and L2 are not equal. The second engaging member 30 including the second engaging area 32 engaging the second pawl g2 defines third and fourth distances from pitch circles of first and second of the plurality of teeth of second pawl g1 to the center O determining third and fourth lengths L3 and L4, respectively. The third and fourth lengths L3 and L4 are not equal. A first line S1 connects pitch circles of the plurality of teeth of the first pawl g1. A second line S2 connects pitch circles of the plurality of teeth of the second pawl g2. The fixing end 411 includes first and second cavities 4111 and 4112 extended therein. The first cavity 4111 includes a first detent received therein. The first detent facilitates the switch 40 to be releasably fixed in the first and second positions thereof. The first detent is selectively engaged in the first and second recesses 131 and 132. The first detent includes a biasing element 42 and a lock member 43 biased by the biasing element 42. The second cavity 4112 includes a biasing mechanism received therein. The biasing mechanism is abutted against a periphery of the receptacle 33. The second engaging member 30 is biased by the biasing mechanism. The biasing mechanism includes a biasing component 44 and a pusher 45 biased by the biasing component 44 to abut against the engaging member 30.

As the switch 40 is operated to the first position, an operation of driving the driving end of the tool in a first direction causes the second engaging member 30 to move towards and include the second engaging area 32 engaging with the first pawl g1 and such that an object engaged with the driving end of the tool is able to be driven in the first direction, and an operation of driving the driving end in a second direction opposite the first direction causes the second engaging member 30 to move away the first pawl g1 and such that the driving end of the tool is in a freewheel rotation with respect to the object engaged therewith. The switch 40 operated to the first position includes the first detent including the lock member 43 engaged in the first recess 131

As the switch 40 is operated to a second position, an operation of driving the driving end in the second direction causes the second engaging member 30 to move towards and include the second engaging area 32 engaging with the second pawl g2 and such that an object engaged with the driving end is able to be driven in the second direction, and an operation of driving the driving end in the first direction causes the second engaging member 30 to move away the second pawl g2 and in a freewheel rotation with respect to the object engaged therewith. The switch 40 operated to the second position includes the first detent including the lock member 43 engaged in the second recess 132.

Figure 12:
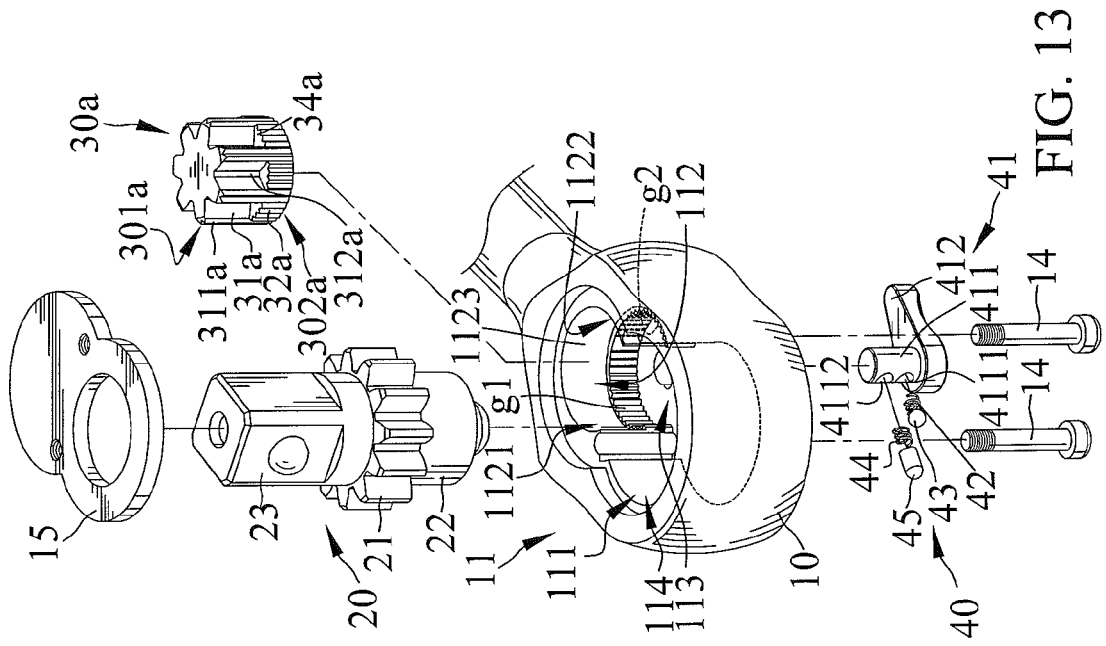
FIG. 12 is a perspective view of a driving end of a tool in accordance with a second embodiment of the present invention.

FIG. 12 shows a driving end of a tool in accordance with a second embodiment of the present invention, and same numbers are used to correlate similar components of the first embodiment, but bearing a letter a. The second embodiment is similar to the first embodiment except it substitutes a second engaging member 30a for the second engaging member 30. The second engaging member 30a differentiates from the second engaging member 30 in that it includes the structure thereof reinforced by a reinforcing section 34a. The reinforcing section 34a includes each portion extended from bottom ends 312a of two adjacent teeth of plurality of teeth of a first engaging area 31a. The reinforcing section 34a is extended radially and portionally disposed between two adjacent teeth of the plurality of teeth of the first engaging area 31a. A second engaging area 32a engagable with the first and second pawls g1 and g2 is also extended on the reinforcing section 34a, with the reinforcing section 34a including a circumference thereof including the plurality of teeth of the second engaging area 32a. The second engaging member 30a includes the first engaging area 31a and the second engaging area 32a extended outward from the first engaging area 31a extended along the longitudinal length thereof and from the first end 301a to the second end 302a thereof. The second engaging member 30a includes the second engaging area 32a extended along the longitudinal length thereof and on the reinforcing section 34a. The second engaging area 32a extended on the reinforcing section 34a has a shorter longitudinal length than the second engaging area 32a extended on first engaging area 31a.

Figure 13:
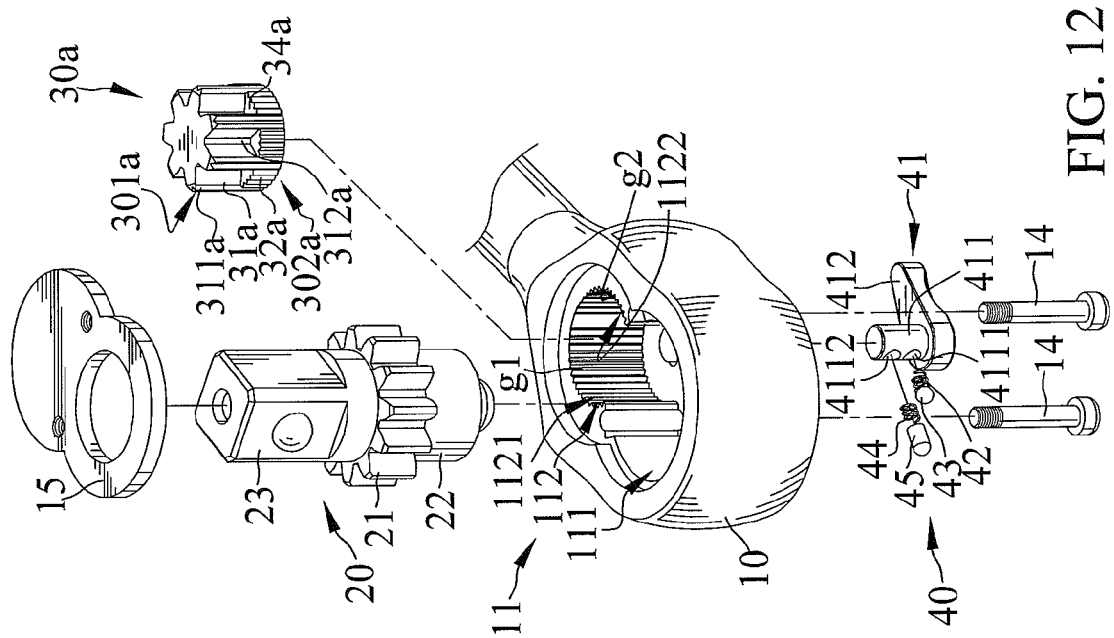
FIG. 13 is a perspective view of a driving end of a tool in accordance with a third embodiment of the present invention.

FIG. 13 shows a driving end of a tool in accordance with a third embodiment of the present invention. The third embodiment is similar to the second embodiment except the second section area 112 of the chamber 11 further includes a periphery on which the first and second pawls g1 and g2 are defined including an edge 1123, with the edge 1123 and the first and second pawls g1 and g2 facing the second engaging member 30a. Moreover, the second engaging member 30a includes the first and second engaging areas 31a and 32a not interfering with the edge 1123.

Figure 14:
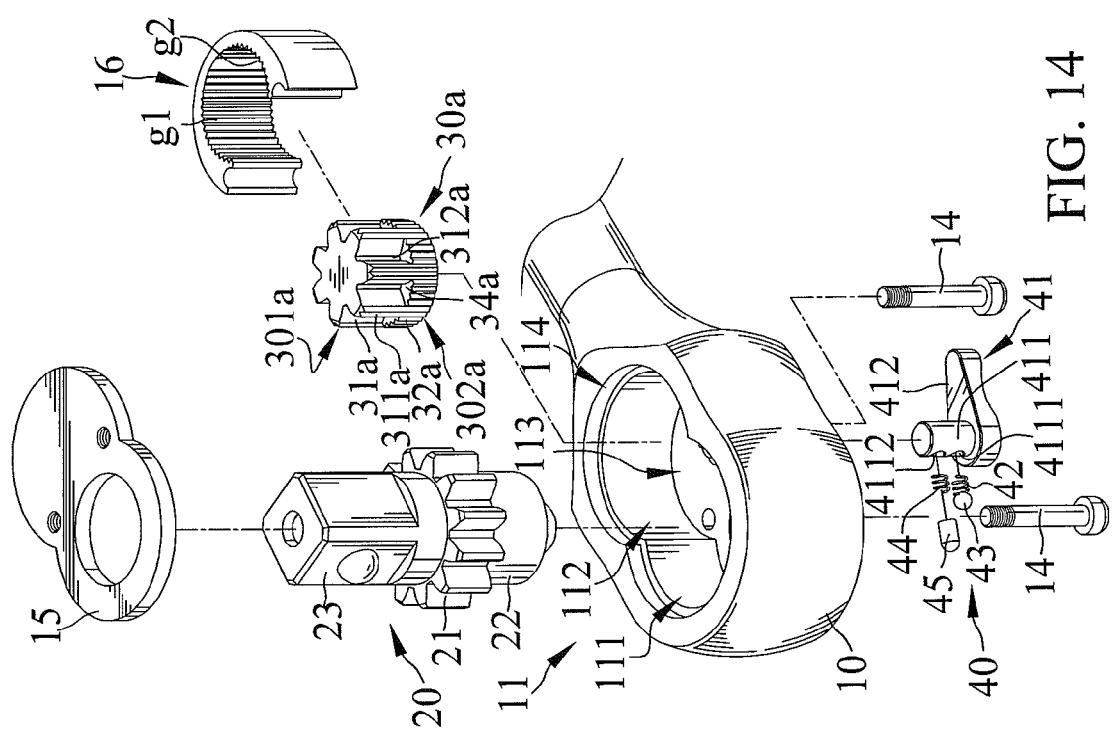
FIG. 14 is a perspective view of a driving end of a tool in accordance with a fourth embodiment of the present invention.

FIG. 14 shows a driving end of a tool in accordance with a fourth embodiment of the present invention. The fourth embodiment is similar to the second embodiment except a block 16 is distinctly formed from the chamber 11 and defines the first and second pawls g1 and g2. The block 16 includes a base side corresponding to and abutting against a periphery of the second sectional area 112 of the chamber 11 and a side opposite the base side including the plurality of teeth of the first and second pawls g1 and g2. The block 16 includes the base side extended annularly. The plurality of teeth of the first and second pawls g1 and g2 are sequentially disposed on an annular side. Each of the first and second pawls g1 and g2 includes two opposite ends thereof defining first and second restraining walls (not numbered). One of the two stoppers 14 is abutted against the first restraining wall of the first pawl g1 and the other stopper 14 is abutted against the first restraining wall of the second pawl g2, respectively.

Figure 15:
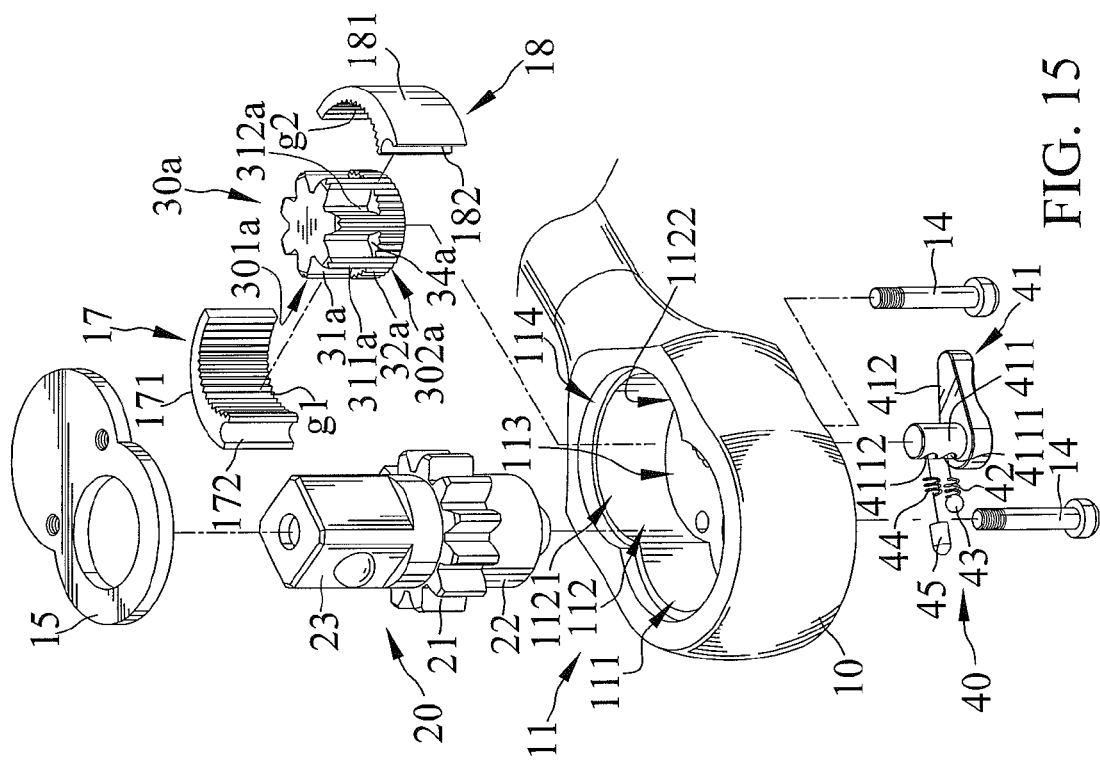
FIG. 15 is a perspective view of a driving end of a tool in accordance with a fifth embodiment of the present invention.

FIG. 15 shows a driving end of a tool in accordance with a fifth embodiment of the present invention. The fifth embodiment is similar to the fourth embodiment except two blocks are distinctly formed from the chamber 11 and define first and second blocks 17 and 18 defining the first and second pawls g1 and g2, respectively. The first block 17 includes a first base wall 171 and the second block 18 includes a second base wall 181 corresponding to and abutting against a periphery of the second sectional area 112 of the chamber 11, respectively. The first block 17 includes a wall opposite the first base wall 171 including the plurality of teeth of the first pawl g1. The second block 18 includes a wall opposite the second base wall 181 including the plurality of teeth of the second pawl g2. Each of the first base wall 171 of the first pawl g1 and the second base wall 181 of the second pawl g2 has an arcuate shape. The first base wall 171 of the first pawl g1 and the second base wall 181 of the second pawl g2 conform to the first and second sides 1121 and 1122, respectively. Each of the first and second pawls g1 and g2 includes two opposite ends thereof defining first and second restraining walls 172 and 173; 182 and 183. Moreover, one of the two stoppers 14 is abutted against the first restraining wall 172 of the first pawl g1 and the other stopper 14 is abutted against the first restraining wall 182 of the second pawl g2, respectively.

Figure 17:
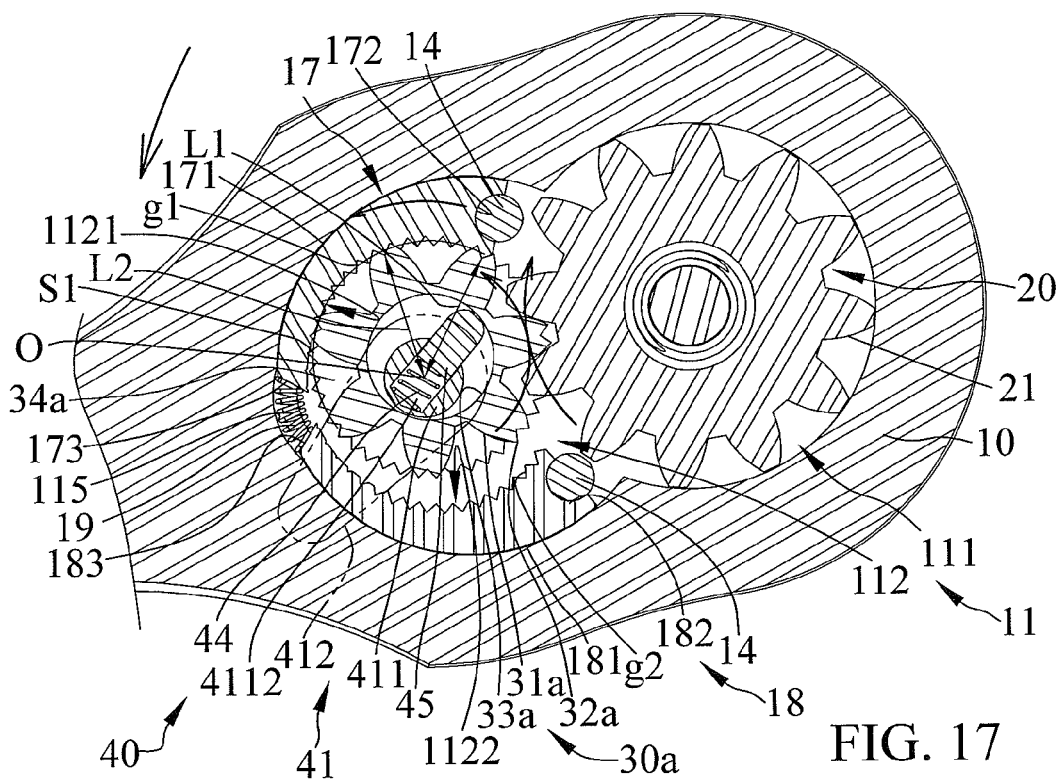
FIG. 17 is a cross-sectional view of the driving end of the tool shown in FIG. 16 and shows the driving end of the tool in an operation of being turned anticlockwise and including a switch operated to a first position.
Figure 16:
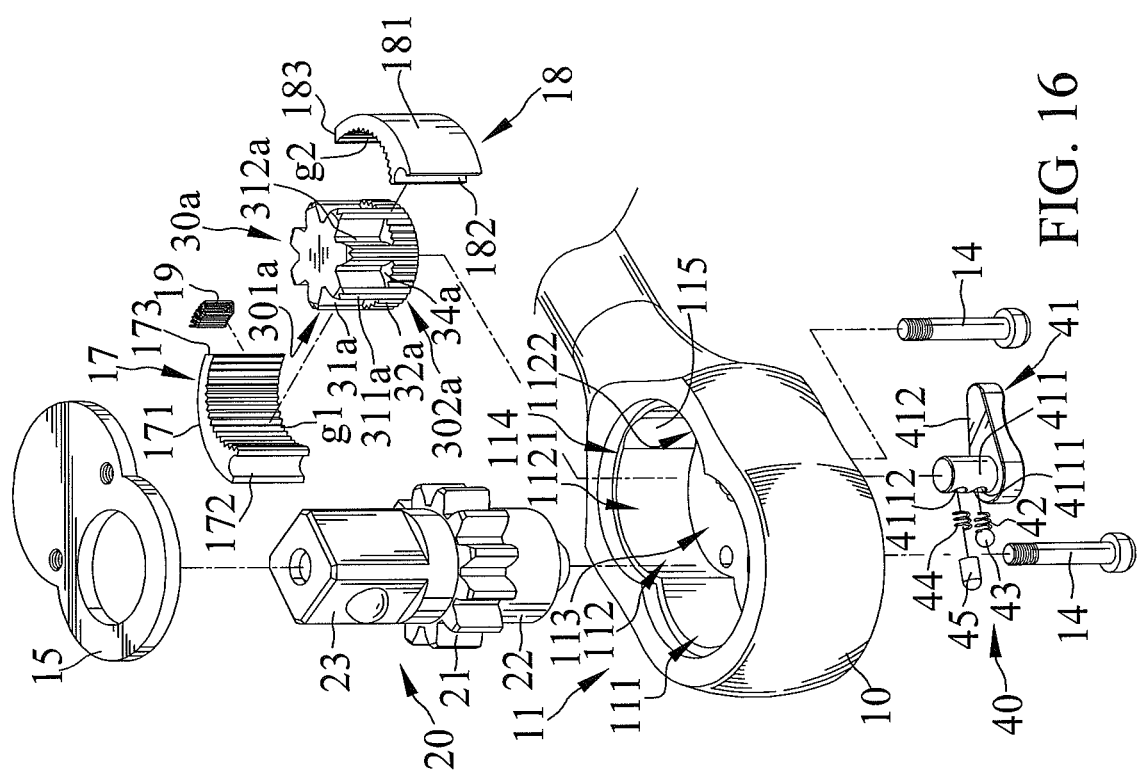
FIG. 16 is a perspective view of a driving end of a tool in accordance with a sixth embodiment of the present invention.

FIGS. 16 through 17 show a driving end of a tool in accordance with a sixth embodiment of the present invention. The sixth embodiment is similar to the fifth embodiment except the first and second blocks 17 and 18 are separately disposed and self-adjustably movable and including a biasing member 19 interconnected therebetween. The biasing member 19 has one of two ends abutting against and restrained by the second restraining wall 173 of the first pawl g1 and the other end abutting against and restrained by the second restraining wall 183 of the second pawl g2, respectively. Additionally, the second sectional area 112 includes a periphery thereof defining an arcuate wall 115. The arcuate wall 115 is defined between the first and second sides 1121 and 1122. The biasing member 19 has a side restrained by the arcuate wall 115.

Figure 18:
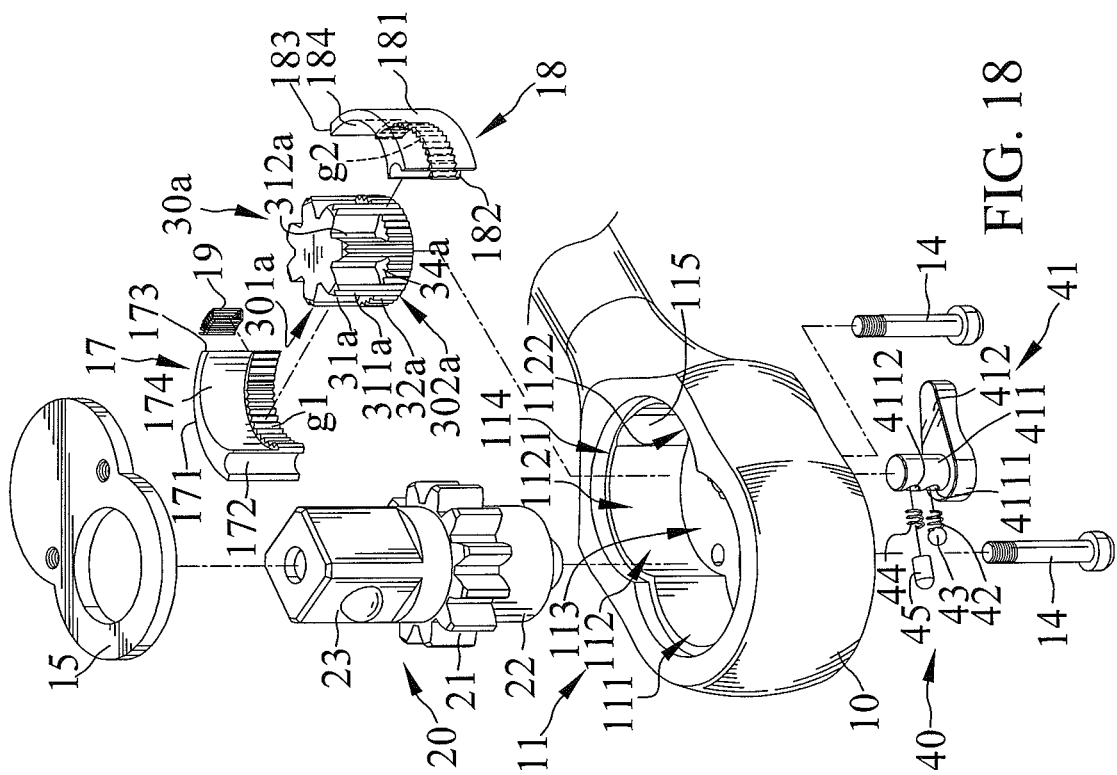
FIG. 18 is a perspective view of a driving end of a tool in accordance with a seventh embodiment of the present invention.

FIG. 18 shows a driving end of a tool in accordance with a seventh embodiment of the present invention. The seventh embodiment is similar to the sixth embodiment except the first block 17 further includes the wall on which the first pawl g1 is extended defining a first edge 174 and the second block 18 further includes the wall on which the second pawl g2 is extended defining a second edge 184, respectively. The first and second edges 174 and 184 face the second engaging member 30a. The second engaging member 30a includes the first and second engaging areas 31a and 32a not interfering with the first and second edges 174 and 184.

Figure 19:
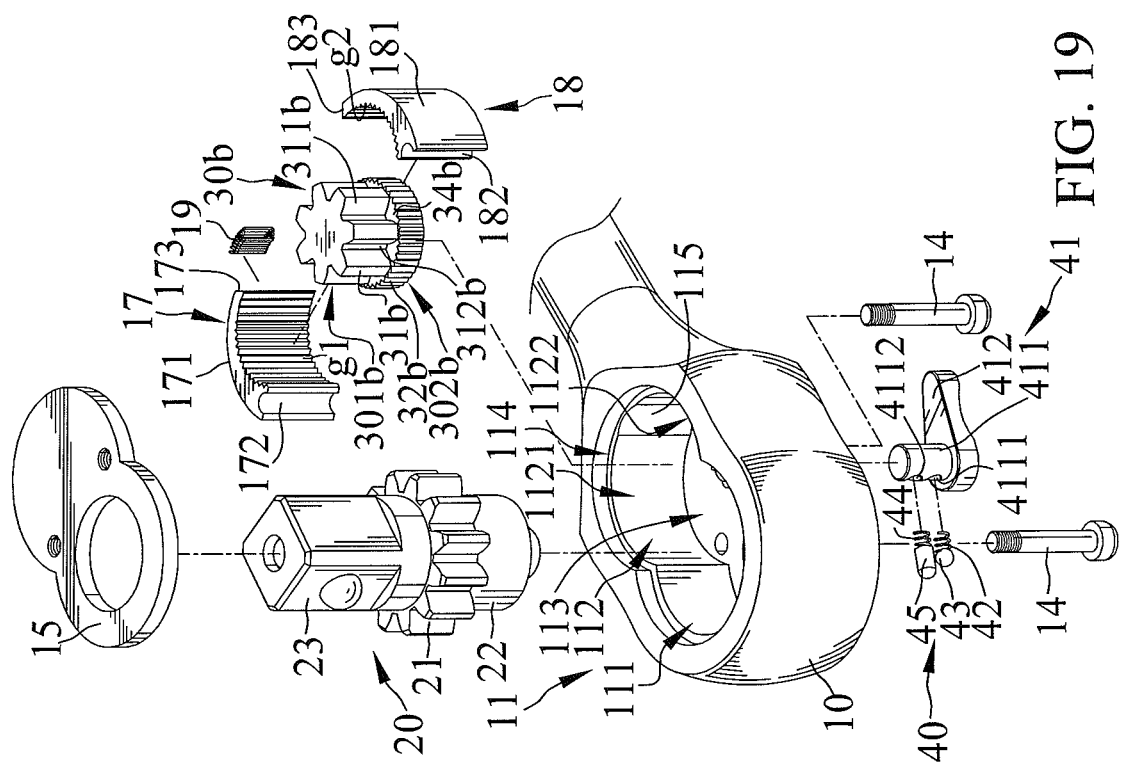
FIG. 19 is a perspective view of a driving end of a tool in accordance with an eighth embodiment of the present invention.

FIG. 19 shows a driving end of a tool in accordance with an eighth embodiment of the present invention, and same numbers are used to correlate similar components of the first embodiment, but bearing a letter b. The eighth embodiment is similar to the sixth embodiment except it substitutes a second engaging member 30b for the second engaging member 30a. The second engaging member 30b includes a first engaging area 31b extended along a longitudinal length thereof and from first end 301b to second end 302b thereof. The second engaging member 30b includes a second engaging area 32b extended along the longitudinal length thereof and on a reinforcing section 34b. The second engaging area 32b extended on the reinforcing section 34b has a shorter longitudinal length than the second engaging area 32a extended on first engaging area 31a. The second engaging member 30b includes the second engaging area 32b extended along the longitudinal length thereof and outward from the first engaging area 31 and with a longitudinal length the same as that extended on the reinforcing section 34b.

In view of the foregoing, the driving end of the tool has a simple structure, but is able to withstand high torque transmission, and a user can operably move through a small angle to drive an object engaged therewith.

While the specific embodiments have been illustrated and described, numerous modifications come to mind without significantly departing from the spirit of invention, and the scope of invention is only limited by the scope of the accompanying claims.

What is claimed is:

1. A driving end of a tool comprising:
a body including a chamber and a bore, with the chamber defining first and second sectional areas, with the bore extended into the second sectional area, with the second sectional area including first and second pawls each with a plurality of teeth on a first side thereof;
a first engaging member rotatably disposed in the first sectional area and defining a first engaging section, with the first engaging section extended circumferentially on an outer periphery of the first engaging member and with a plurality of teeth;
a second engaging member rotatably disposed in the second sectional area and defining first and second engaging areas, with the first engaging section engaged with the first engaging area, with the second engaging area selectively engaged with the first and second pawls, the second engaging area with a plurality of teeth extended outward from the first engaging area and circumferentially on an outer periphery of the second engaging member below the first engaging area; and
a switch including an activating member inserted through the bore and operably rotatable about a fixed axis to first and second positions selectively, with the second engaging member rotated eccentrically about the fixed axis upon rotation of the switch, with the switch operated to the first position that an operation of driving the driving end of the tool in a first direction causes the second engaging member to move towards and include the second engaging area engaging with the first pawl and such that an object engaged with the driving end of the tool is able to be driven in the first direction and that an operation of driving the driving end in a second direction opposite the first direction causes the second engaging member to move away the first pawl and such that the driving end of the tool is in a freewheel rotation with respect to the object engaged therewith, with the switch operated to a second position that an operation of driving the driving end in the second direction causes the second engaging member to move towards and include the second engaging area engaging with the second pawl and such that an object engaged with the driving end is able to be driven in the second direction and that an operation of driving the driving end in the first direction causes the second engaging member to move away the second pawl and in a freewheel rotation with respect to the object engaged therewith.

2. The driving end of the tool as claimed in claim 1, wherein a block is formed separately from the chamber and defines the first and second pawls respectively, with the block including a base side corresponding to and abutting against a periphery of the second sectional area of the chamber and a side opposite the base side including the plurality of teeth of the first and second pawls.

3. The driving end of the tool as claimed in claim 1, wherein two blocks are formed separately from the chamber and define first and second blocks defining the first and second pawls, with the first block including a first base wall and the second block including a second base wall corresponding to and abutting against a periphery of the second sectional area of the chamber respectively, with the first block including a wall opposite the first base wall including the plurality of teeth of the first pawl, with the second block including a wall opposite the second base wall including the plurality of teeth of the second pawl.

4. The driving end of the tool as claimed in claim 1, wherein the first engaging area of the second engaging member forms a plurality of teeth, wherein a reinforcing section is extended radially and disposed between two adjacent teeth of the plurality of teeth of the first engaging area, and wherein the second engaging area engagable with the first and second pawls is also extended on the reinforcing section, with the reinforcing section including a circumference thereof including the plurality of teeth of the second engaging area.

5. The driving end of the tool as claimed in claim 1, wherein the second engaging member includes a first end and a second end opposite to the first end, with the first and second ends longitudinally apart from each other at a distance defining a longitudinal length of the second engaging member, and wherein the second engaging member includes the first and second engaging areas with the second engaging area extended along the longitudinal length thereof from the first end to the second end thereof.

6. The driving end of the tool as claimed in claim 4, wherein the second engaging member includes a first end and a second end opposite to the first end, with the first and second ends longitudinally apart from each other at a distance defining a longitudinal length of the second engaging member, wherein the second engaging member includes the first engaging area and the second engaging area extended outward from the first engaging area with the second engaging area extended along the longitudinal length thereof from the first end to the second end thereof, wherein the second engaging member includes the second engaging area extended along the longitudinal length thereof and on the reinforcing section, and wherein the second engaging area extended on the reinforcing section has a shorter longitudinal length than the second engaging area extended on first engaging area.

7. The driving end of the tool as claimed in claim 3, wherein the first and second blocks are separately disposed and self-adjustably movable and including a biasing member interconnected therebetween.

8. The driving end of the tool as claimed in claim 1, wherein the switch defines a fixing end inserted through the bore and received eccentrically in a receptacle extended in the second engaging member, wherein the switch is operably rotated about a center of the fixing end, with the center disposed on the fixed axis, wherein each of the plurality of teeth of the second engaging area of the second engaging member has an identical shape and is extended in a same radial length, wherein the second engaging member including the second engaging area engaging the first pawl defines first and second distances from pitch circles of first and second of the plurality of teeth of first pawl to the center determining first and second lengths respectively, with the second length not equaling to the first length, and wherein the second engaging member including the second engaging area engaging the second pawl defines third and fourth distances from pitch circles of first and second of the plurality of teeth of second pawl to the center determining third and fourth lengths respectively, with the third length not equaling to the fourth length.

9. The driving end of the tool as claimed in claim 1, wherein the chamber includes an opening closed by a cover member, wherein the cover member is fixed by two fasteners, with the two fasteners inserted through the cover member and received in the second sectional area, wherein each of the first and second pawls includes two opposite ends thereof defining first and second restraining walls, and wherein one of the two fasteners is abutted against the first restraining wall of the first pawl and the other fastener is abutted against the first restraining wall of the second pawl, respectively.

10. The driving end of the tool as claimed in claim 2, wherein the chamber includes an opening closed by a cover member, wherein the cover member is fixed by two fasteners, with the two fasteners inserted through the cover member and received in the second sectional area, wherein each of the first and second pawls includes two opposite ends thereof defining first and second restraining walls, and wherein one of the two fasteners is abutted against the first restraining wall of the first pawl and the other fasteners is abutted against the first restraining wall of the second pawl, respectively.

11. The driving end of the tool as claimed in claim 3, wherein the chamber includes an opening closed by a cover member, wherein the cover member is fixed by two fasteners, with the two fasteners inserted through the cover member and received in the second sectional area, wherein each of the first and second pawls includes two opposite ends thereof defining first and second restraining walls, and wherein one of the two fasteners is abutted against the first restraining wall of the first pawl and the other fastener is abutted against the first restraining wall of the second pawl, respectively.

12. The driving end of the tool as claimed in claim 8, wherein the body includes first and second recesses extended therein and into the bore, wherein the fixing end includes a first cavity extended therein, wherein the first cavity includes a first detent received therein, and wherein the first detent is selectively engaged in the first and second recesses, with the switch operated to the first position including the first detent engaged in the first recess, with the switch operated to the second position including the first detent engaged in the second recess.

13. The driving end of the tool as claimed in claim 12, wherein the fixing end includes a second cavity extended therein, wherein the second cavity includes a biasing mechanism received therein, and wherein the biasing mechanism is abutted against a periphery of the receptacle, with the second engaging member biased by the biasing mechanism.

14. The driving end of the tool as claimed in claim 1, wherein the first engaging area of the second engaging member forms a plurality of teeth and includes each of the plurality of teeth with a first tooth thickness and two adjacent teeth with a first width of space, wherein the ratio of first tooth thickness to first width of space is in a range of 1~1.14, wherein the second engaging area of the second engaging member includes each of the plurality of teeth with a second tooth thickness and two adjacent teeth with a second width of space, and wherein the ratio of second tooth thickness to first width of space is in a range of 0.92~1.22.

15. The driving end of the tool as claimed in claim 2, wherein the first engaging area of the second engaging member forms a plurality of teeth and includes each of the plurality of teeth with a first tooth thickness and two adjacent teeth with a first width of space, wherein the ratio of first tooth thickness to first width of space is in a range of 1~1.14, wherein the second engaging area of the second engaging member includes each of the plurality of teeth with a second tooth thickness and two adjacent teeth with a second width of space, and wherein the ratio of second tooth thickness to first width of space is in a range of 0.92~1.22.

16. The driving end of the tool as claimed in claim 3, wherein the first engaging area of the second engaging member forms a plurality of teeth and includes each of the plurality of teeth with a first tooth thickness and two adjacent teeth with a first width of space, wherein the ratio of first tooth thickness to first width of space is in a range of 1~1.14, wherein the second engaging area of the second engaging member includes each of the plurality of teeth with a second tooth thickness and two adjacent teeth with a second width of space, and wherein the ratio of second tooth thickness to first width of space is in a range of 0.92~1.22.

17. The driving end of the tool as claimed in claim 1, wherein the second section area of the chamber includes a periphery thereof defining an edge and the first and second pawls facing the second engaging member, and wherein the second engaging member includes the first and second engaging areas not interfering with the edge.

18. The driving end of the tool as claimed in claim 3, wherein the first block includes the wall on which the first pawl is extended defining a first edge, wherein the second block includes the wall on which the second pawl is extended defining a second edge, wherein the first and second edges face the second engaging member, and wherein the second engaging member includes the first and second engaging areas not interfering with the first and second edges.

19. The driving end of the tool as claimed in claim 4, wherein the first block includes the wall on which the first pawl is extended defining a first edge, wherein the second block includes the wall on which the second pawl is extended defining a second edge, wherein the first and second edges face the second engaging member, and wherein the second engaging member includes the first and second engaging areas not interfering with the first and second edges.

* * * * *